Feb. 2, 1932.  L. B. LEWIS  1,843,396
GLARE SHIELD
Filed Oct. 1, 1930
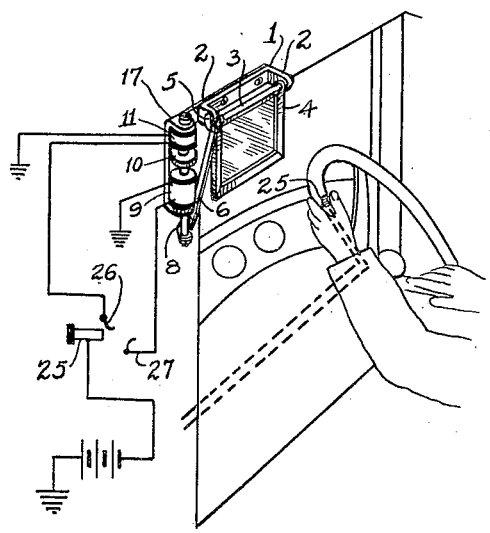
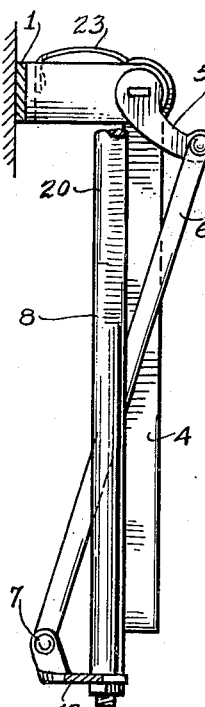
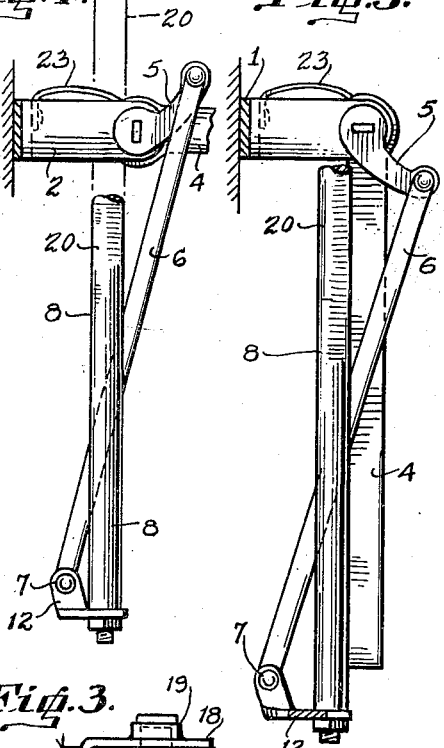
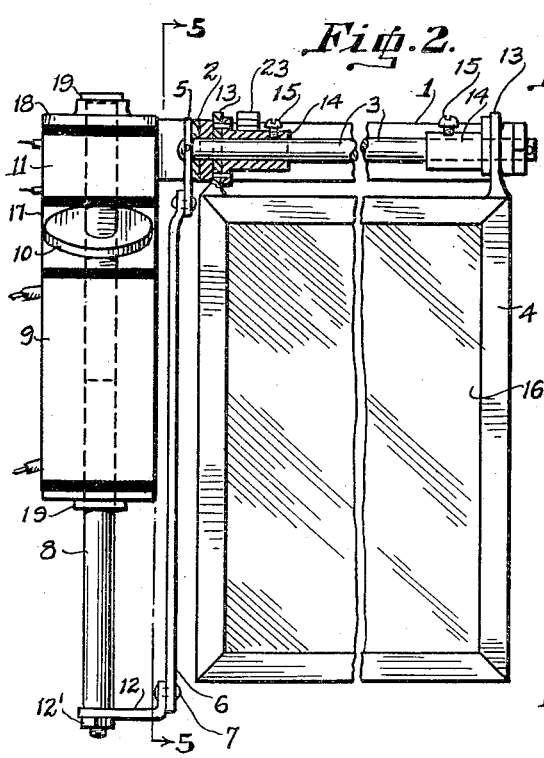
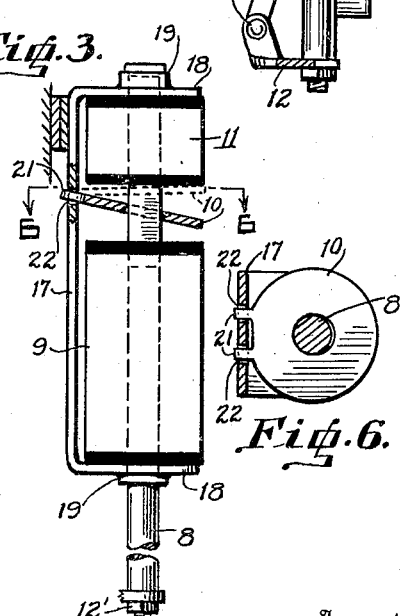
Inventor
Longworth B. Lewis
By Mason Fenwick & Lawrence
Attorneys Patented Feb. 2, 1932

1,843,396

UNITED STATES PATENT OFFICE

LONGWORTH B. LEWIS, OF MONTROSS, VIRGINIA

GLARE SHIELD

Application filed October 1, 1930. Serial No. 485,750.

This invention relates to glare shields for use in automobiles, and more particularly to an improved and simplified operating mechanism by means of which a glare shield can be instantly raised by the driver and normally held in elevated inoperative position by suitable locking means, which locking means may be released, permitting the glare shield to gravitate into operative position.

The object of the invention is to provide a device of the character indicated, in which the operation is positive and rapid, and in which the operating mechanism embraces relatively few and sturdy parts capable of compact arrangement and efficient operation.

The invention consists in the novel construction, arrangement and combination of parts hereinafter more specifically specified and claimed.

One sheet of drawings accompanies this specification as part thereof, in which like reference characters indicate like parts throughout.

Fig. 1 is a perspective of the improved device shown applied diagrammatically to the wind shield frame of an automobile.

Fig. 2 is a front elevation of the improved device showing the glare shield in lowered and operative position.

Fig. 3 is an end elevation of the solenoid device partly in cross section.

Figs. 4 and 5 are vertical cross sections taken on line 5—5 of Fig. 2, and showing respectively the device with the glare shield raised in Fig. 4 and with the glare shield lowered in Fig. 5.

Fig. 6 is a detail view of the locking washer.

Referring to the drawings, 1 represents a frame of U-shape, between the legs 2—2 of which is pivoted a shaft 3, to which is secured a frame 4, which, with the translucent member 16 held in said frame constitute and will be hereinafter referred to as the glare shield.

As illustrated, frame 4 is secured to shaft 3 by means of lugs 13 secured to sleeve members 14, which are secured upon shaft 3 by screws 15.

Upon one end of shaft 3 is secured a crank arm 5, and upon the same end of frame member 1 is secured a second U-shaped frame 17. This second frame 17 being arranged perpendicular to frame 1. Within frame 17 and secured to the arms 18—18 thereof are two spaced solenoids 9 and 11, the lower solenoid 9 being substantially larger and more powerful than the upper solenoid 11. Each of the arms 18—18 of frame member 17 is provided with bearings 19, within which is slidably seated a core rod 8, the lower end of which is of steel and the upper end 20 of which is of bronze or other non-magnetic material.

On an arm 12 suitably secured to the lower end of core rod 8 as by a nut 12' is pivoted, as at 7, a connecting rod 6, the other end of which rod is pivotally connected to crank arm 5.

Positioned intermediate the solenoids 9 and 11 is a locking washer 10 surrounding core rod 8. This locking washer 10 has an orifice slightly larger than rod 8 and is provided with two offset lugs 21, by means of which this washer is pivotally associated with frame member 17, which is provided with spaced slots 22 adapted to receive these lugs 21.

A tension spring 23 may, if desired, be secured to frame member 1 and arranged to frictionally engage one of the sleeve members 14 to prevent any chatter of the glare shield.

A switch 25 is provided, preferably located on the steering wheel of the automobile, this switch including two contact members 26 and 27, which are adapted to be operated in succession, switch 25 completing a circuit through contact 26 associated with the winding of the upper solenoid 11, and then upon further operation of switch 25, contact 27 will complete the circuit through the winding of the solenoid 9.

In operation with the glare shield 4 in raised or horizontal and inoperative position, locking washer 10 will engage core rod 8 to maintain the shield in this position as illustrated in Fig. 3. To lower the glare shield 4 into operative position, switch 25 will be pressed until contact is made with contact 26, thus energizing the upper solenoid 11, which will throw locking washer 10 into horizontal position as indicated in dotted lines in Fig. 3, thus releasing core rod 8 and permitting same to drop together with glare shield 4. When it is desired to raise glare shield 4 into inoperative position, switch 25 will be operated to first contact 26, which will again release locking washer 10 and then further to contact 27, which will energize solenoid 9 and draw the lower steel end of core rod 8 upwardly into solenoid 9, thus raising connecting rod 6 and rotating crank arm 5 to elevate glare shield 4. Upon the release of switch 25, the circuits of both solenoids will be broken, whereupon locking washer 10 again grips core rod 8 to hold glare shield 4 in elevated position, and the device is ready for a repetition of the operation.

Various modifications of the precise construction and arrangement of parts will readily suggest themselves to those skilled in the art but within the scope of the present invention as claimed.

What I claim is:

1. A glare shield comprising a hinged panel and operating means therefor comprising a solenoid, a core for said solenoid, operatively connected to said panel for raising the latter when said solenoid is energized, and a brake normally engaging said core for locking said panel in raised position, and means for releasing said brake and activating said solenoid in sequential order as named.

2. A glare shield comprising a hinged panel positioned to be lowered by gravity, and operating means for raising said panel comprising a solenoid, a core for said solenoid operatively connected to said panel, a brake normally engaging said core for locking said panel in raised position, and means for releasing said brake to permit gravitational descent of said panel, said means cooperating with said solenoid, to release said brake and activate said solenoid in sequential order as named.

3. A glare shield comprising a hinged panel and operating means therefor, comprising a pair of solenoids, a core for said solenoids and operatively connected to said panel for raising the latter when one of said solenoids is energized, a brake acting upon said core between said solenoids and operated by energization of the other of said solenoids, and means for activating said solenoids in succession.

4. A glare shield comprising a hinged panel, two aligned solenoids, a rod reciprocable through said solenoids having the part within one solenoid of magnetic material and that within the other of non-magnetic material, a magnetically controlled brake device operatively associated with one of said solenoids, means operatively associating said rod with said hinged panel, and means for selectively energizing the solenoids.

5. A glare shield comprising a hinged panel, two aligned solenoids, a rod core reciprocable through said solenoids operatively connected with said panel, the part of the rod within one solenoid being non-magnetic and the remainder of the rod magnetic, a pivoted magnetic washer surrounding the rod between the solenoids adapted to grip said rod to lock same, and means for successively energizing said solenoids.

LONGWORTH B. LEWIS.